(12) United States Patent
Bhikhi et al.

(10) Patent No.: US 9,969,628 B2
(45) Date of Patent: May 15, 2018

(54) ELECTRODIALYSIS

(71) Applicant: Fujifilm Manufacturing Europe B.V., Tilburg (NL)

(72) Inventors: Vinodnarain Bhikhi, Tilburg (NL); Willem Van Baak, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 383 days.

(21) Appl. No.: 14/904,534

(22) PCT Filed: Jun. 12, 2014

(86) PCT No.: PCT/GB2014/051808
§ 371 (c)(1),
(2) Date: Jan. 12, 2016

(87) PCT Pub. No.: WO2015/004417
PCT Pub. Date: Jan. 15, 2015

(65) Prior Publication Data
US 2016/0152492 A1    Jun. 2, 2016

(30) Foreign Application Priority Data

Jul. 12, 2013 (GB) .................................. 1312491.2

(51) Int. Cl.
*B01D 61/44* (2006.01)
*C02F 1/469* (2006.01)
(Continued)

(52) U.S. Cl.
CPC ............ *C02F 1/4693* (2013.01); *B01D 61/44* (2013.01); *B01D 61/54* (2013.01); *C02F 1/4695* (2013.01);
(Continued)

(58) Field of Classification Search
None
See application file for complete search history.

(56) References Cited

U.S. PATENT DOCUMENTS

| 4,925,541 A | 5/1990 | Giuffrida et al. |
| 6,017,433 A | 1/2000 | Mani |

(Continued)

FOREIGN PATENT DOCUMENTS

| GB | 1115532 A | 5/1968 |
| WO | 2005/044427 A1 | 5/2005 |

OTHER PUBLICATIONS

International Search Report issued from corresponding PCT/GB2014/051808, dated Oct. 6, 2014.

(Continued)

*Primary Examiner* — Arun S Phasge
(74) *Attorney, Agent, or Firm* — Banner & Witcoff, Ltd.

(57) ABSTRACT

An electrodialysis unit comprising at least two electrodialysis stacks (ED1 and ED2) connected in series, wherein: (a) stacks ED1 and ED2 comprise anion exchange membranes and cation exchange membranes; and (b) the anion exchange membranes in stack ED1 have a lower electrical resistance than the anion exchange membranes in stack ED2 and the cation exchange membranes in stack ED1 have a lower electrical resistance than the cation exchange membranes in stack ED2. Also claimed is a process for purifying liquids, e.g. for desalinating sea water or brackish water.

20 Claims, 1 Drawing Sheet

(51) Int. Cl.
*B01D 61/54* (2006.01)
*C02F 103/08* (2006.01)

(52) U.S. Cl.
CPC ...... *B01D 2317/02* (2013.01); *B01D 2317/04* (2013.01); *C02F 2103/08* (2013.01); *C02F 2201/4614* (2013.01); *C02F 2201/46135* (2013.01); *C02F 2301/08* (2013.01); *Y02A 20/134* (2018.01)

(56) References Cited

U.S. PATENT DOCUMENTS

| | | | |
|---|---|---|---|
| 6,824,662 B2 | 11/2004 | Liang et al. | |
| 8,142,633 B2 * | 3/2012 | Batchelder | B01D 61/422 204/524 |
| 8,236,158 B2 | 8/2012 | Sparrow et al. | |
| 2004/0198849 A1 | 10/2004 | Aminabhavi et al. | |
| 2007/0215474 A1 | 9/2007 | Batchelder et al. | |
| 2007/0278099 A1 | 12/2007 | Barber | |
| 2010/0116663 A1 | 5/2010 | Davis | |
| 2011/0284376 A1 | 11/2011 | Ng et al. | |
| 2015/0203377 A1 | 7/2015 | Wallace | |
| 2015/0344332 A1 | 12/2015 | Gu | |

OTHER PUBLICATIONS

C. Larchet et al, Comparison of different ED stack conceptions when applied for drinking water production from brackish waters, Desalination, vol. 222, Issues 1-3, Mar. 1, 2008, pp. 489-496.

Marian Turek, Dual-purpose desalination-salt production electrodialysis, Desalination, vol. 153, Issues 1-3. Feb. 10, 2003, pp. 377-381.

Mondor, M et al. Use of Electrodialysis and reverse osmosis for recovery and concentration of ammonia from swine manure, Bioresour. Tech. Nov. 2008; 99( 15), 7363-8.

Tongwen Xu, Ion Exchange Membranes: State of Their Development and Perspective, Journal of Membrane Science, Oct. 2005; 263( 1-2).

* cited by examiner

ELECTRODIALYSIS

RELATED APPLICATION DATA

This application is a National Stage Application under 35 U.S.C. 371 of co-pending PCT application number PCT/GB2014/051808 designating the United States and filed Jun. 12, 2014; which claims the benefit of GB application number 1312491.2 and filed Jul. 12, 2013 each of which are hereby incorporated by reference in their entireties.

This invention relates to an electrodialysis ("ED") unit and to a process for purifying an aqueous feed liquid.

The first commercially available ED units were developed in the 1950's to demineralize brackish water. Since then, improvements in ion exchange membranes have lead to significant advances in ED.

Figure 1:
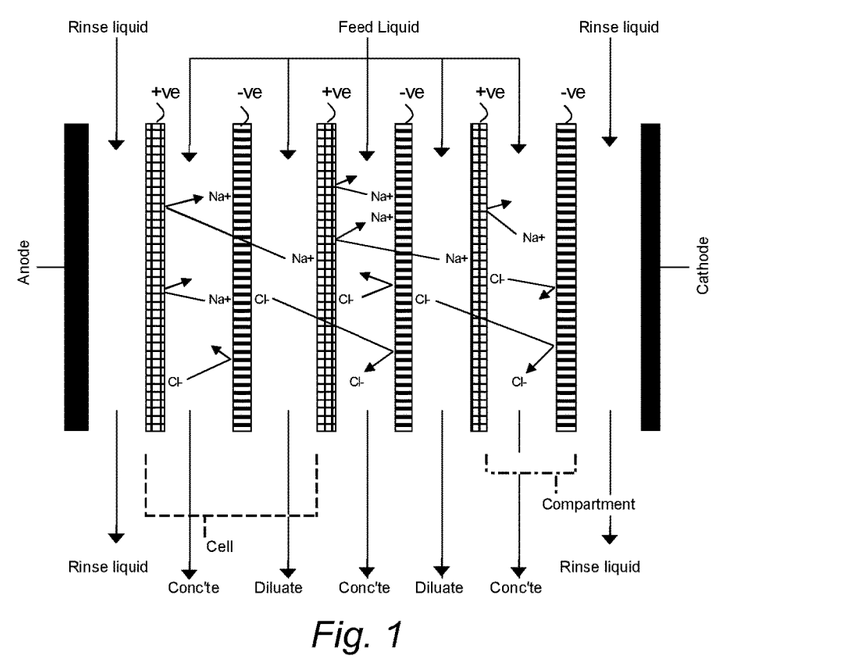
FIG. 1 schematically depicts one ED stack in use.

ED units typically comprise one or more membrane stacks. Each stack comprises an anode, a cathode and a number of cell pairs through which liquids pass. A cell pair comprises a diluate compartment and a concentrate compartment. Each cell has a wall made from a negatively charged cation exchange membrane and a wall made from a positively charged anion exchange membrane. When a feed liquid (sometimes called a 'feed solution') passes through the cells and a (DC) voltage is applied across the electrodes, dissolved cations pass through the cation exchange membrane and towards the anode, whereas dissolved anions pass through the anion exchange membrane and towards the cathode. Typically the cathode and anode are washed with a rinse liquid during the deionisation process. In this way, the cations and anions (e.g. $Na^+$ and $Cl^-$ from the salt in seawater) originally present in the feed liquid permeate through the membranes walls, to leave behind a diluate stream (having a lower ionic content than the original feed liquid) and form a concentrate stream (having a higher ionic content than the feed liquid). ED units can be used to convert a feed liquid of sea or brackish water into potable water having a much lower content of dissolved salts. The typical arrangement of a membrane stack is illustrated in FIG. 1.

In contrast to ED units, electrodeionisation ("EDI") units additionally comprise one or more ion-exchange resins in the diluate stream to increase its ionic conductivity. Typically ED units are used to purify feed liquids having a high content of dissolved salts whereas EDI units are used to ultrapurify feed liquids which already have quite a low content of dissolved salts. The presence of these ion-exchange resins is what distinguishes EDI units from ED units.

One of the major costs of running an ED unit is for the electric power applied across the anode and cathode. Desirably the ED unit requires as little electric power as possible to purify a feed liquid.

During the initial phase of desalination using an ED unit, the concentration of dissolved salts in the feed liquid is typically quite high. Therefore the feed liquid has a very low electrical resistance. In this phase, the electrical resistance of the membranes has a large impact on the overall electrical resistance of the ED unit and therefore on the amount of electric power consumed. In this initial phase of desalination a membrane having a very low electrical resistance is therefore of importance to achieve a low level of electrical power consumption.

However in the later phases of desalination processes, most of the dissolved salts have been removed from the feed liquid and the electrical resistance of the ED unit—specifically of the diluate stream—increases enormously. The electrical resistance of the membranes is then of much less importance to the overall electrical resistance of the ED unit than the electrical resistance of the feed liquid which has been depleted of ions derived from dissolved salts. In these later phases, the water-permeability of the membranes becomes an important factor influencing the amount of electrical power required to purify the partly desalinated feed liquid.

Although the membranes used in ED units are widely regarded as being water-impermeable, during ED (i.e. electrodialysis), small amounts of water are in fact transported through the membranes in a process known as "electro-osmosis". In electro-osmosis, each ion (derived from salts dissolved in the feed liquid) is surrounded by several water molecules which then pass through a membrane together with the ion. The number of water molecules per ion (i.e. the water transport number) depends on the identity of the ion and on the conditions such as the salt concentration of the feed liquid and the temperature.

Another mechanism by which water is transported through membranes during ED is conventional osmosis. The difference in salt concentration between the concentrate and diluate streams on either side of the membrane causes some water to pass through the membranes from the dilute stream to the concentrate stream. The extent to which osmosis occurs in an ED unit is strongly influenced by the morphology of the membranes present in the unit.

In any case, water loss during ED by electro-osmosis and by osmosis is undesirable because it reduces the overall yield of purified water obtained from the ED unit.

In the later phases of desalination using ED, the concentration difference between the diluate and concentrate streams is relatively large. This difference increases the loss of water molecules through the membranes due to osmosis. Therefore in these later phases, membranes having a low water-permeability are desired.

The ideal membranes for an ED unit therefore have both a low electrical resistance and low water-permeability. Unfortunately, however, there is generally a trade-off in membranes between their electrical resistance and water-permeability. A low electrical resistance membrane is achieved by ensuring the membrane has an open structure that restricts the flow of the ions through the membrane as little as possible. However such open membrane structures tend to exhibit more swelling which then increases water-permeability. On the other hand, water-permeability can be reduced by using a more rigid membrane structure, but as a consequence the electrical resistance of the membrane increases.

US2011068002 claims to have succeeded in making membranes having both a low electrical resistance and low water-permeability. However the membranes are expensive and/or not so suitable for mass production.

The present invention therefore seeks to provide an ED unit and a process for purifying aqueous feed liquids which is economical, e.g. by not requiring expensive membranes or large amounts of electric power.

According to the present invention there is provided an electrodialysis unit comprising at least two electrodialysis stacks (ED1 and ED2) connected in series, wherein:

(a) stacks ED1 and ED2 comprise anion exchange membranes and cation exchange membranes; and (b) the anion exchange membranes in stack ED1 have a lower electrical resistance than the anion exchange membranes in stack ED2 and the cation exchange membranes in stack ED1 have a lower electrical resistance than the cation exchange membranes in stack ED2.

The present invention seeks to solve the dilemma of how to achieve efficient desalination in both the early and late stages of electrodialysis, when the ionic strengths of the feed liquids are very different. As a result, expensive membranes having unusual properties are not needed and the electric energy required to perform the process is kept low.

By using two or more ED stacks connected in series, with the membranes in the first stack ED1 having lower electrical resistance than the corresponding membranes in the next stack (ED2), one may achieve both a low electrical resistance in the early phase of desalination and a low water-permeability in the later phase of desalination.

In a preferred embodiment the electrodialysis unit further comprises a third electrodialysis stack (ED3) comprising anion exchange membranes and cation exchange membranes. Stack ED2 is located downstream of stack ED1 and is preferably connected in series to stack ED1. Stack ED3 is located downstream of stack ED2 and is preferably connected in series to stack ED2.

In FIG. 1, the ED stack comprises an anode at one end and a cathode at the other end. Alternating anion exchange (+ve) and cation exchange (−ve) membranes separate the anode and cathode and define cells as shown. As the feed liquid enters the ED stack at the top and passes down, cations permeate through the cation exchange membranes and anions permeate through anion exchange membranes to create concentrate and diluate streams. As a consequence of the ion permeation, alternate concentrate and diluate streams are generated in the ED stack. Typically the anode and cathode are washed during electrodialysis using rinse liquid(s).

Figure 2A:
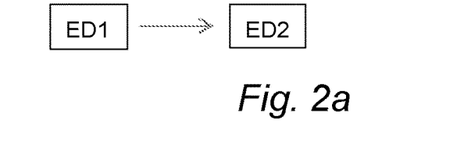
FIG. 2a schematically depicts an ED unit comprising two ED stacks in series (ED1 and ED2).

FIG. 2a schematically depicts an ED unit comprising two ED stacks in series, namely ED1 and ED2. The embodiment of FIG. 2A is a preferred embodiment in which stack ED2 is located downstream to stack ED1. In other words, aqueous feed liquid entering the ED unit passes through stack ED1 before entering and passing through stack ED2.

Figure 2B:
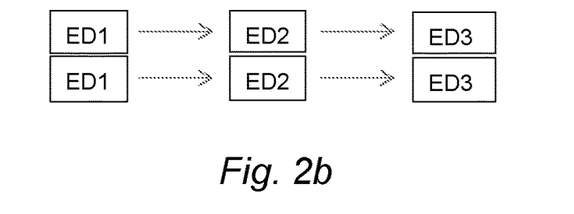
FIG. 2b schematically depicts a larger scale ED unit comprising a total of six ED stacks.

FIG. 2b schematically depicts an ED unit comprising six ED stacks. Each stack ED1 is connected in series to the next stack ED2 and each stack ED2 is connected in series to the next stack ED3. This arrangement is duplicated in the unit, in parallel, to double the throughput of the ED unit.

For the initial phase of desalination (where the feed liquid has a relatively high concentration of salts) one preferably uses membranes in stack ED1 having a relatively low electrical resistance. In contrast, for the later phase of desalination (where the feed liquid has a relatively low concentration of salts), the electrical resistance of the partly desalinated feed liquid is much higher and therefore a higher resistivity membrane for subsequent ED stacks can be tolerated.

Thus the anion exchange membranes in stack ED1 have a lower electrical resistance than the anion exchange membranes in stack ED2 and the cation exchange membranes in stack ED1 have a lower electrical resistance than the cation exchange membranes in stack ED2.

Preferably the electrical resistance of the cation exchange membranes in stack ED1 is 1.5 to 20 times, more preferably 1.5 to 15 times (e.g. 2 to 15 times), especially 1.5 to 10 times (e.g. 2.5 to 10 times) lower than the electrical resistance of the cation exchange membranes in stack ED2.

Preferably the electrical resistance of the anion exchange membranes in stack ED1 is 1.5 to 25 times, more preferably 1.5 to 20 times (e.g. 2 to 20 times), especially 1.5 to 12 times (e.g. 2.5 to 12 times), lower than the electrical resistance of the anion exchange membranes in stack ED2.

The cation exchange membranes in stack ED1 preferably have an electrical resistance of less than 5 ohm·cm$^2$, more preferably less than 3 ohm·cm$^2$, especially less than 2 ohm·cm$^2$, most preferably less than 1.5 ohm·cm$^2$.

The electrical resistance values described and claimed in this specification are determined using a 0.5M NaCl solution at 25° C. A more detailed description of how to measure electrical resistance using a 0.5M NaCl solution at 25° C. is illustrated in the Examples below.

The anion exchange membranes in stack ED1 preferably have an electrical resistance of less than 4 ohm·cm$^2$, more preferably less than 2 ohm·cm$^2$, especially less than 1.5 ohm·cm$^2$, most preferably less than 1.0 ohm·cm$^2$.

The cation exchange membranes in stack ED2 preferably have an electrical resistance of less than 20 ohm·cm$^2$, more preferably less than 12 ohm·cm$^2$, especially less than 10 ohm·cm$^2$, more especially less than 8 ohm·cm$^2$.

The anion exchange membranes in stack ED2 preferably have less than 20 ohm·cm$^2$, more preferably less than 10 ohm·cm$^2$, especially less than 7 ohm·cm$^2$, more especially less than 5 ohm·cm$^2$.

The properties of the anion exchange membranes in optional electrodialysis stack ED3 are preferably different to the properties of the anion exchange membranes in stack ED2 and/or the properties of the cation exchange membranes in stack ED3 are different to the properties of the cation exchange membranes in stack ED2. For example, in one embodiment, the anion exchange membranes in stack ED2 have a lower electrical resistance than the anion exchange membranes in stack ED3 and the cation exchange membranes in stack ED2 have a lower electrical resistance than the cation exchange membranes in stack ED3.

Preferably the electrical resistance of the cation exchange membranes in stack ED2 is 1.1 to 15 times, more preferably 1.1 to 12 times (e.g. 1.5 to 12 times), especially 1.1 to 10 times (e.g. 2 to 11 times) lower than the electrical resistance of the cation exchange membranes in stack ED3 (when present).

Preferably the electrical resistance of the anion exchange membranes in stack ED2 is 1.1 to 12 times, more preferably 1.1 to 10 times (e.g. 1.4 to 10 times), especially 1.1 to 8 times (e.g. 1.6 to 8 times) lower than the electrical resistance of the anion exchange membranes in stack ED3 (when present).

The cation exchange membranes in optional stack ED3 preferably have an electrical resistance of less than 25 ohm·cm$^2$, more preferably less than 15 ohm·cm$^2$, especially less than 10 ohm·cm$^2$.

The anion exchange membranes in optional stack ED3 preferably have an electrical resistance of less than 20 ohm·cm$^2$, more preferably less than 12 ohm·cm$^2$, especially less than 8 ohm·cm$^2$.

Preferably all of the cation exchange membranes present in the ED unit have a standardized permselectivity higher than 85%, more preferably higher than 90%, especially higher than 94%.

Preferably all anion exchange membranes present in the ED unit have a standardized permselectivity higher than 90%, more preferably higher than 92%, especially higher than 94%.

The standardized permselectivity may be measured using 0.05 M KCl and 0.5 M KCl solutions at 21° C., as described below in the Examples.

The anion exchange membranes in stack ED2 preferably have a lower water-permeability than the anion exchange membranes in stack ED1 and the cation exchange membranes in stack ED2 preferably have a lower water-permeability than the cation exchange membranes in stack ED1.

Preferably the water-permeability of the cation exchange membranes in stack ED2 is 1.5 to 30 times, more preferably 2 to 20 times, especially 2.5 to 15 times lower than the water-permeability of the cation exchange membranes in stack ED1.

Preferably the water-permeability of the anion exchange membranes in stack ED2 is 1.5 to 30 times, more preferably 2 to 20 times, especially 2.5 to 15 times lower than the water-permeability of the anion exchange membranes in stack ED1.

Also when the ED unit comprises a third stack ED3, the anion exchange membranes in stack ED3 preferably have a lower water-permeability than the anion exchange membranes in stack ED2 and the cation exchange membranes in stack ED3 preferably have a lower water-permeability than the cation exchange membranes in stack ED2.

Preferably the water-permeability of the cation exchange membranes in stack ED3 (when present) is 1.5 to 20 times, more preferably 2 to 15 times, especially 2.5 to 10 times lower than the water-permeability of the cation exchange membranes in stack ED2.

Preferably the water-permeability of the anion exchange membranes in stack ED3 (when present) is 1.5 to 20 times, more preferably 2 to 15 times, especially 2.5 to 10 times lower than the water-permeability of the anion exchange membranes in stack ED2.

The water-permeability of the anion and cation exchange membranes in stack ED1 is preferably less than $100 \times 10^{-12}$ $m^3/m^2 \cdot s \cdot kPa$, more preferably less than $70 \times 10^{-12}$ $m^3/m^2 \cdot s \cdot kPa$, especially less than $50 \times 10^{-12}$ $m^3/m^2 \cdot s \cdot kPa$.

The water-permeability of the anion and cation exchange membranes in stack ED2 is preferably less than $30 \times 10^{-12}$ $m^3/m^2 \cdot s \cdot kPa$, more preferably less than $20 \times 10^{-12}$ $m^3/m^2 \cdot s \cdot kPa$, especially less than $15 \times 10^{-12}$ $m^3/m^2 \cdot s \cdot kPa$, most preferably less than $10 \times 10^{-12}$ $m^3/m^2 \cdot s \cdot kPa$.

The water-permeability of the anion and cation exchange membranes in stack ED3 is preferably less than $25 \times 10^{-12}$ $m^3/m^2 \cdot s \cdot kPa$, more preferably less than $18 \times 10^{-12}$ $m^3/m^2 \cdot s \cdot kPa$, especially less than $12 \times 10^{-12}$ $m^3/m^2 \cdot s \cdot kPa$, most preferably less than $9 \times 10^{-12}$ $m^3/m^2 \cdot s \cdot kPa$.

The water-permeability mentioned above and in the claims is the water-permeability when corrected for electroosmosis and ion transportation, as illustrated in more detail below in the Examples.

The electrodialysis unit is preferably free from particulate ion exchange resins. Such resins are typically used in EDI stacks, but not in ED stacks.

According to a second aspect of the present invention there is provided an apparatus for purifying water comprising an electrodialysis unit according to the first aspect of the present invention and an electrodeionization unit located downstream of the electrodialysis unit. This apparatus is useful for providing a higher level of purification than achieved in the first aspect of the present invention, although at higher cost due to the particulate ion exchange resins used in EDI stacks.

According to a third aspect of the present invention there is provided a process for purifying an aqueous feed liquid comprising passing the feed liquid through an electrodialysis unit according to the first aspect of the present invention or an apparatus according to the second aspect of the present invention such that the feed liquid is separated into a concentrate and a diluate. The concentrate is typically enriched in ions that were present in the original feed liquid and the diluate is typically depleted in ions that were present in the original feed liquid.

Preferably the process is performed such that the diluate exiting stack ED1 has a conductivity of 15 to 4 mS/cm, more preferably 12 to 7 mS/cm.

Preferably the process is performed such that the diluate exiting stack ED2 has a conductivity level of 5 to 0.1 mS/cm, more preferably 2 to 0.3 mS/cm.

The process is preferably performed such that the feed liquid (comprising ions) passes through stack ED1 to form a diluate and a concentrate and then the diluate exiting stack ED1 is fed into stack ED2 in order to further lower the concentration of ions dissolved therein.

In another embodiment, the process is performed such that the diluate exiting stack ED1 has a conductivity level of 35 to 15 mS/cm, more preferably 30 to 20 mS/cm. In this embodiment, the process is preferably performed such that the diluate exiting stack ED2 has a conductivity level of 20 to 1 mS/cm, more preferably 15 to 4 mS/cm.

A further desalination may be achieved using an additional ED step or by using a (continuous) electrodeionization device.

The ED stacks and EDI stacks (when present) comprise an anode and a cathode. When an electric field is established across the anode and cathode, cations present in the aqueous feed liquid are attracted to the anode and anions present in the aqueous feed liquid are attracted to the cathode.

The amount of electric current passed through each stack may be the same as that passed through one or more of the other stacks or it may be different. For example, the electric current passed through stack ED1 may be more or less than the electric current passed through stack ED2. Also the electric current passed through stack ED3, when present, may be more or less than the electric current passed through stack ED2.

Preferably the process comprises the application of a constant current density to stack ED1, e.g. of 50 to 1000 $A/m^2$, more preferably between 75 and 600 $A/m^2$. Alternatively a constant voltage is applied to stack ED1.

When the process is a recirculation process (i.e. the feed liquid passes through the ED unit several times until the desired level of desalination is reached) the current density applied to stack ED1 may be constant or it may be changed periodically, e.g. for each cycle through stack ED1. For example the current density applied to stack ED1 may initially be e.g. 250 $A/m^2$, and when the salt concentration in the diluate stream is reduced to a predetermined level the current density may be reduced to a value of e.g. 150 $A/m^2$. The salt concentration can be determined by a standard conductivity measurement.

One may apply to stack ED2 a constant current density, a constant voltage or both a constant current density and a constant voltage. Because the electrical resistance of the diluate stream in stack ED2 is higher than for stack ED1, preferably a lower current density and/or lower voltage is applied to stack ED2 than to stack ED1. In recirculation mode it is possible to apply a constant current and variable voltage then subsequently to apply a constant voltage and variable current. Alternatively one may apply current in a step-wise manner, for example by applying a constant current value initially, and then later in the process apply a different constant current (e.g. a lower, constant current).

Switching from constant current to constant voltage or decreasing the constant current value is particularly useful to optimize the energy consumption of the process.

Constant voltage is preferred when the electrical resistance of the cell is high, e.g. when the salt concentration of the stream passing through it is low, to prevent water splitting. The preferred voltage applied across the anode and cathode depends on the number of cells in the stack, the ionic conductivity of the stream within the cell and the membrane properties, and is preferably between 0.2 and 2.0 V/cell, more preferably between 0.3 and 1.4 V/cell. When using the ED unit in single pass mode a current density or voltage setting has to be chosen for each ED stack.

The process may be performed using only the one set of ED units connected in series (as illustrated in FIG. 2a), or alternatively one may scale-up the process by performing the process with several ED units according to the invention running in parallel (as illustrated in FIG. 2b). The process scale may also be increased by increasing the size and/or number of cells present in each ED stack.

The ED units and apparatus of the present invention are particularly useful for the purification of sea water or brackish water as the aqueous feed liquid. In such cases, the sea water or brackish water are preferably converted into a diluate suitable for drinking (i.e. potable water) or for watering crops. However the ED units and apparatus of the present invention may also be used for purifying other feed liquids containing cations and anions in an analogous manner. The ED unit and apparatus of the present invention may be used, for example, to reduce the cost of purifying a feed liquid, e.g. to form potable water.

Many types of ion exchange membranes that have the desired properties may be used in the invention. Preferably membranes of low cost are used. The membranes may be of the flat sheet type or they may be profiled, e.g. having ribs or protrusions of any shape. Examples of suitable shapes include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, and combinations of two or more thereof.

A wide variety of ion exchange membranes having different electrical resistivities and water-permeabilities are commercially available, e.g. from companies such as FUJI-FILM, Ionics, Asahi Glass, Asahi Chemical, Tokuyama Soda, Fumatech, Pall, SnowPure, PCA and Membranes International.

In one embodiment the compartments in one or more stacks are formed by the profiles on the membranes and/or by using spacers. The spacers preferably have a thickness of between 0.01 and 1 mm, more preferably between 0.05 and 0.3 mm. The spacers may be made from any suitable material, for example porous organic or inorganic woven or nonwoven fabric, e.g. of polyethylene, polypropylene or polyamide.

The number of cells within each stack is not particularly limited. Preferably each stack independently comprises from 10 to 2000 cell pairs, more preferably from 50 to 800 cell pairs.

The invention will now be illustrated with non-limiting examples where all parts and percentages are by weight unless specified otherwise.

In the examples the following properties were measured by the methods described below.

General Test Methods

Permselectivity ($\alpha$ (%)) was measured by using a static membrane potential measurement. Two cells were separated by the membrane under investigation. Prior to the measurement the membrane was equilibrated in a 0.05 M KCl solution for 16 hours. Two streams having different KCl concentrations were then passed through cells on opposite sides of the membranes under investigation. One stream had a concentration of 0.05M KCl (from Sigma Aldrich, min. 99.0% purity) and the other stream had a concentration of 0.5 M KCl. The flow rate of both streams was 0.5 L/min (using a Cole Parmer Masterflex console drive (77521-47) with easy load II model 77200-62 gear pumps). Two Ag/AgCl reference electrodes type 6.0750.100 (from Metrohm AG, Switzerland) filled with 3M KCl were connected to Haber-Luggin capillary tubes that were inserted in each cell and were used to measure the potential difference over the membrane. The effective membrane area was 9.62 cm$^2$ and the temperature was 21° C.

When a steady state was reached, the membrane potential was measured ($\Delta$Vmeas).

The permselectivity ($\alpha$ (%)) of the membrane was calculated according the formula:

$$\alpha(\%) = \Delta V\text{meas}/\Delta V\text{theor} * 100\%.$$

The theoretical membrane potential ($\Delta$Vtheor) is the potential for a 100% permselective membrane as calculated using the Nernst equation.

The measured values were corrected for the (constant) potential deviation between the two reference electrodes.

Electrical resistance ER (ohm·cm$^2$) was measured by the method described by Djugolecki et al, J. of Membrane Science, 319 (2008) on page 217-218 with the following modifications:

- the auxiliary membranes were CMX and AMX from Tokuyama Soda, Japan;
- the capillaries as well as the Ag/AgCl references electrodes (Metrohm type 6.0750.100) contained 3M KCl;
- the calibration liquid and the liquid in compartment 2, 3, 4 and 5 was 0.5 M NaCl solution at 25° C.;
- the effective membrane area was 9.62 cm$^2$;
- the distance between the capillaries was 5.0 mm;
- the measuring temperature was 25° C.;
- a Cole Parmer Masterflex console drive (77521-47) with easy load II model 77200-62 gear pumps was used for all compartments;
- the flowrate of each stream was 475 ml/min controlled by Porter Instrument flowmeters (type 150AV-B250-4RVS) and Cole Parmer flowmeters (type G-30217-90).

The Water-permeability (WP) was determined by performing the calculation described below in Formula (1) below:

$$WP = WP_u + CF \quad \text{Formula (1)}$$

wherein:

$WP_u$ is the uncorrected water-permeability of the membrane in m$^3$/m$^2$·s·kPa, calculated using Formula (2) below; and CF is the correction factor in m$^3$/m$^2$·s·kPa to take account of electro-osmosis and ion transportation through the membrane, calculated using Formula (3) below.

$WP_u$ was calculated using Formula (2) as follows:

$$WP_u = (\Delta W/(SA \times \text{Time} \times D_{H2O} \times P_{os})) \quad \text{Formula (2)}$$

wherein:

$\Delta W$ is the average change in weight in Mg (n.b. Mg means 1000 Kg) according to the calculation $\Delta W = [(W_{C2} - W_{C1}) + (W_{D2} - W_{D1})] \times 10^{-6}/2$;

$W_{c1}$ is the start weight of the concentrate in g;

$W_{c2}$ is the end weight of the concentrate in g;
$W_{D1}$ is the start weight of the diluate in g;
$W_{D2}$ is the end weight of the diluate in g; and
$D_{H2O}$ is the density of water in $Mg/m^3$ (i.e. 1)
SA is the surface area of the membrane under test in $m^2$;
Time is the duration of the measurement in seconds; and
$P_{os}$ is the osmotic pressure in kPa, calculated using Formula (4) below.

The correction factor CF was calculated using Formula (3) as follows:

$$CF = \frac{((M_H \times V_H + M_L \times V_L) \times 10^{-6}/2 \times (MW_{NaCl} + MW_{8H2O}))}{(SA \times \text{Time} \times D_{H2O} \times P_{OS})} \quad \text{Formula (3)}$$

wherein:
$M_H$ is the change in molar concentration of NaCl in the concentrate respectively in mol/L;
$V_H$ is the change in volume of the concentrate in liters ("L");
$M_L$ is the change in molar concentration of NaCl in the diluate in mol/L;
$V_H$ is the change in volume of the diluate in L;
$MW_{NaCl}$ is the molecular weight of the salt being removed (i.e. 58.44 in the case of NaCl);
$MW_{8H2O}$ is the molecular weight of water being removed with the salt (i.e. 8×(1+1+16) in the case of NaCl=144); and
SA, Time, $D_{H2O}$ and $P_{os}$ are as hereinbefore defined.

Several of the integers used above were measured as follows:

Measurement of Osmotic Pressure ($P_{os}$)

A membrane sample at least 30×9 cm in size was conditioned for 16 hours in a 0.1 M NaCl (5.843 g/L) solution.

The membrane was clamped between two spacers (PE netting/PES gasket, 290 μm thick, strand distance 0.8 mm, 310×110 mm, effective area 280×80 mm) on either side supported by a PMMA plate each having a cavity of 3 mm deep creating chambers having a volume of 280×80×3 mm on each side of the membrane. The two chambers, together with the membrane separating them, constituted a test cell. The spacer minimized the formation of an electrical double layer. The plates were greased to prevent leakage and fastened to each other by 12 bolts and nuts using a torque of 10 N/m.

Prior to the actual measurement, the chambers were washed with the relevant concentrate and diluate. The concentrate and diluate were then pumped into the chambers either side of the membrane under test via Masterflex PharmaPure tubing using a Masterflex console drive (77521-47) with Easy Load II model 77200-62 gear pumps at a rate of 0.31 L/min. On one side of the membrane the chamber contained 0.7M NaCl (40.91 g/L, i.e. the concentrate) and the chamber on the other side of the membrane contained 0.1 M NaCl (i.e. the diluate). Air was removed by placing the cell in a vertical position. After 5 minutes the pumps are switched in reverse direction and the chambers were emptied. The measurements required to calculate water-permeability of the membrane began by filling the chambers with the concentrate and diluate at a speed of 0.26 L/min, corresponding with about 0.9 cm/s. The concentrate and diluate were circulated through their respective chambers via storage containers for at least 16 hours after which the chambers were emptied again. The start weights ($W_{C1}$ and $W_{D1}$), start densities ($D_{C1}+D_{D1}$), end weights ($W_{D2}$ and $W_{D2}$) and end densities ($D_{C2}+D_{D2}$), of the concentrate and diluate were measured as well as their absolute temperatures and the exact duration of the experiment in hours. From the densities, the molar concentrations of NaCl were calculated according formula:

Molar concentration=(density−0.9985)/0.0403

The osmotic pressure ($P_{os}$) in kPa was then calculated using Formula (4):

$$P_{os} = i \times [((M_{C1}+M_{C2})-(M_{D1}+M_{D2}))/2] \times R \times \text{Temp} \quad \text{Formula (4)}$$

wherein:
i is the van't Hoff factor;
$M_{c1}$ is the starting molar concentration of the concentrate in $mol/m^3$;
$M_{C2}$ is the end molar concentration of the concentrate in $mol/m^3$;
$M_{D1}$ is the starting molar concentration of the diluate in $mol/m^3$;
$M_{D2}$ is the end molar concentration of the diluate in $mol/m^3$;
R is the gas constant in $kPa\ m^3\ K^{-1}\ mol^{-1}$; and
Temp is the average temperature of the concentrate and diluate in Kelvin during the test.

When the membrane is being used to remove NaCl from water containing NaCl, the van't Hoff factor (i) is 2 because each molecule of NaCl dissociates completely into two ions ($Na^+$ and $Cl^-$). R is $0.008314\ kPa\ m^3\ K^{-1}$.

Experimental Set-Up

The following membranes were used in the experiments.

Preparation of Membranes

Anion exchange membranes AEM-A and AEM-B and cation exchange membranes CEM-A and CEM-B were prepared as described below:

Ingredients

AMPS is 2-Acryloylamido-2-methylpropanesulfonic acid from Hang-Zhou (China).

DMAPAA-Q is 3-acrylamidopropyl-trimethylammonium chloride from Kohjin.

MBA is N,N'-methylene bisacrylamide from Sigma Aldrich.

SR259 is polyethylene glycol (200) diacrylate from Sartomer.

PW is pure water (an inert solvent).

IPA is 2-propanol from Shell (an inert organic solvent).

Darocur™ 1173 is 2-hydroxy-2-methyl-1-phenyl-propan-1-one, a photoinitiator from BASF Resins, Paint & Coatings.

MeHQ is hydroquinone monomethyl ether, a polymerisation inhibitor from Merck.

$LiNO_3$ is lithium nitrate from Sigma Aldrich.

$LiOH.H_2O$ is lithium hydroxide monohydrate from Chemetall.

Viledon® Novatexx 2223-10 is a nonwoven polyolefine porous substrate from Freudenberg Filtration Technologies.

Viledon® Novatexx 2226-14E is a nonwoven polyolefine porous substrate from Freudenberg Filtration Technologies.

Surfactant was a polyether siloxane from Evonik.

TABLE 1

| | Membranes | | | |
|---|---|---|---|---|
| ingredient | AEM-A | CEM-A | AEM-B | CEM-B |
| Porous support | 2223-10 | 2223-10 | 2226-14E | 2226-14E |
| DMAPAA-Q | 34.3 | 0.0 | 34.3 | 0.0 |

TABLE 1-continued

| ingredient | Membranes | | | |
|---|---|---|---|---|
| | AEM-A | CEM-A | AEM-B | CEM-B |
| AMPS | 0.0 | 42.8 | 0.0 | 49.1 |
| MBA | 13.0 | 16.1 | 13.0 | 11.6 |
| SR-259 | 0.0 | 0.0 | 15.0 | 12.0 |
| PW | 22.8 | 12.5 | 16.2 | 15.5 |
| IPA | 8.4 | 18.1 | 0.0 | 0.0 |
| Darocur ™ 1173 | 0.5 | 0.5 | 0.5 | 0.5 |
| MEHQ | 0.05 | 0.5 | 0.05 | 0.5 |
| LiNO3 | 19.95 | 0.0 | 19.95 | 0.0 |
| LiOH•H2O | 0.0 | 8.5 | 0.0 | 9.8 |
| Surfactant | 1.0 | 1.0 | 1.0 | 1.0 |

Curable compositions were prepared by mixing the ingredients indicated in Table 1 (all amounts are wt % relative to the total weight of curable composition).

The resultant curable compositions were applied to an aluminum support using a 150 μm wire wound bar, at a speed of approximately 5 m/min, by hand, followed by application of a non-woven support. The non-woven support was completely soaked with the composition. Subsequently the composition was leveled using a 4 micrometer wire wound rod coater. The temperature of the curable compositions was about 50° C. during coating and somewhat lower just before curing. A membrane was prepared by curing the coated support using a Light Hammer LH10 from Fusion UV Systems fitted with a D-bulb working at 100% intensity with a speed of 30 m/min (single pass). The exposure time was 0.47 seconds. After curing, the membrane was stored in a 0.1 M NaCl solution for at least 12 hours.

The Permselectivity (α (%)), Electrical resistance ER (ohm·cm$^2$) and Water-permeability (WP) of anion exchange membranes AEM-A, AEM-B and cation exchange membranes CEM-A and CEM-B were measured as described above and the results are shown in Table 2 below:

TABLE 2

| Membrane type | ER (ohm · cm$^2$) at 0.5M NaCl | α (%) | WP (×10$^{-12}$ m$^3$/m$^2$ · s · kPa) |
|---|---|---|---|
| AEM-A | 1.3 | 92 | 41.7 |
| CEM-A | 1.9 | 93 | 36.3 |
| AEM-B | 5.0 | 96 | 7.5 |
| CEM-B | 8.0 | 97 | 8.9 |

As an example, the calculation of the water-permeability (WP) of membrane CEM-A using Formula (1) above is illustrated below with reference to CEM-A. When calculating the correction factor CF, there were assumed to be 4 moles of water transported through the membrane for each mole of Na$^+$ ions or Cl$^-$ ions, making 8 moles of water transported per mole of NaCl.

TABLE 3

Measured properties for calculating the water-permeability (WP) of CEM-A

| Measured property | Abbreviation used in above | Measured value | Molar concentration* (mol/L) |
|---|---|---|---|
| Average temperature of the diluate and concentrate (K) | Temp | 294.5 | |
| Duration of the measurement (hours) | Time | 21.8 | |
| Start density of the concentrate (g/ml) | $D_{C1}$ | 1.0263 | 0.690 |
| End density of the concentrate (g/ml) | $D_{C2}$ | 1.0195 | 0.522 |
| Start density of the diluate (g/ml) | $D_{D1}$ | 1.0025 | 0.100 |
| End density of the diluate (g/ml) | $D_{D2}$ | 1.0061 | 0.190 |
| Start weight of the concentrate (g) | $W_{C1}$ | 763.2 | |
| End weight of the concentrate (g) | $W_{C2}$ | 892.5 | |
| Start weight of the diluate (g) | $W_{D1}$ | 911.5 | |
| End weight of the diluate (g) | $W_{D2}$ | 774.8 | |

*From the density, the molar concentration of NaCl was calculated according formula: Molar concentration = (density − 0.9985)/0.0403

Calculation of WPu for CEM-A

The uncorrected water-permeability ($WP_u$) for membrane CEM-A was calculated by inputting the data from Table 1 into Formula (2) described above:

ΔW was ((892.5−763.2)+(911.5−774.8))×10$^{-6}$/2=0.000133 Mg.

Time was 21.8 hours=78480 seconds.

$P_{os}$ was 2×1000×((0.690+0.522)−(0.190+0.100))/2×0.008314×294.5=2258 kPa.

$D_{H2O}$ was 1 Mg/m$^3$.

SA was 0.0224 m$^2$.

The uncorrected water-permeability ($WP_u$) of membrane CEM-A was therefore 0.000133/(0.0224×78480×1×2258)= 33.5×10$^{-12}$ m$^3$/m$^2$·s·kPa.

Calculation of CF for CEM-A

The correction factor CF for CEM-A (correcting for salt and hydration shell water transported through the membrane) was calculated by inputting the data from Table 1 into Formula (3) described above:

The volumes $V_H$ and $V_L$ were calculated from the corresponding measured start and end weights $W_{C1}$, $W_{c2}$, $W_{D1}$ and $W_{D2}$ divided by the corresponding measured densities $D_{c1}$, $D_{C2}$, $D_{D1}$ and $D_{D2}$.

CF was therefore (((0.690×0.7632/1.0263−0.522×0.8925/1.0195)+(0.190×0.7748/1.0061−0.100×0.9115/1.0025))×10$^{-6}$/2×(58.44+144)/(0.0224×78480×1×2258)=2.8×10$^{-12}$ m$^3$/m$^2$·s·kPa.

Calculation of WP for CEM-A

Thus the WP for CEM-A was (33.5+2.8) 10$^{-12}$ m$^3$/m$^2$·s·kPa=36.3×10$^{-12}$ M$^3$/M$^2$·s·kPa.

Preparation of ED Stacks

Two ED stacks (ED1 and ED2) were prepared from ion exchange membranes AEM-A and CEM-A (ED1) and from AEM-B and CEM-B (ED2) respectively. Each ED stack comprised a feed entry port, a diluate exit port, a concentrate exit port, one anode, one cathode, electrode compartments for each of the anode and cathode, and 20 cell pairs (in total 21 cation and 20 anion exchange membranes) between the anode and cathode. Each cell comprised a diluate compartment and a concentrate compartment formed by a wall made from a cationic membrane and a wall made from an anionic membrane, separated by spacers (made of PET, 290 μm thick) as indicated in FIG. 1. In stack ED1, the cationic membranes were CEM-A and the anionic membranes were AEM-A. In stack ED2, the cationic membranes were CEM-B and the anionic membranes were AEM-B.

The effective membrane surface area of each of stacks ED1 and ED2 was 100 cm² (10×10 cm).

Preparation of ED Unit

An ED Unit was prepared by connecting a diluate stock tank to the diluate entry port and the diluate exit port of stack ED1 and a concentrate stock tank to the concentrate entry port and the concentrate exit port of stack ED1. A liquid connection was provided between the diluate stock tank of stack ED1 and the diluate stock tank of stack ED2 such that the contents of the diluate stock tank of stack ED1 could be fed into the diluate stock tank of stack ED2 after completion of the first desalination step. There was also a liquid connection between the feed liquid stock tank and the concentrate stock tank of stack ED2. Therefore stack ED2 was downstream of stack ED1.

Purification Using the ED Unit

Experiments

Desalination of artificial seawater feed liquid (3 wt % NaCl in water, conductivity 48.8 mS/cm) was performed using the abovementioned ED unit comprising stack ED1 and stack ED2, connected in series. At the start of the desalination, 5 liters of the artificial seawater was pumped from a feed liquid stock tank into each of (i) the diluate stock tank for stack ED1; and (ii) the concentrate stock tank for stack ED1. The artificial seawater was then recirculated through the diluate and concentrate compartments of stack ED1 at a flow rate of 20 L/h corresponding with a flow velocity of 1 cm/s until the conductivity of the diluate stream was reduced to the value as indicated in Table 4 below ("Final conductivity ED1"). Then the diluate stream from stack ED1 was fed into the diluate stock tank of stack ED2, where it was recirculated through the diluate compartment of stack ED2 until it had the final conductivity ED2 indicated in Table 4 below. After completing the first desalination step the content of the concentrate stock tank of stack ED1 was not used anymore. The feed liquid for the concentrate compartments of stack ED2 was the original artificial seawater. The feed liquid in the concentrate compartment of stack ED2 was recirculated through the concentrate compartment of stack ED2. During the process, the electrode compartments of stacks ED1 and ED2 were rinsed continuously with a 0.5M solution of Na₂SO₄ at a flow rate of 140 L/h. The pumps used were Verdermag centrifugal pumps of type V-MD40C for the diluate and concentrate streams and of type V-MD30 for the rinsing of the electrode compartments.

During the process the current and voltage were monitored as well as the conductivity and the volume level in the diluate circulation tank. The energy consumption was calculated as follows:

Energy consumption (kWh/m³) was $$\sum_{t=0}^{t=i} Ii \times Vi \times \Delta ti / (1000 \times DVi)$$

wherein $Ii$ is the current (A) at $t=i$;

$Vi$ is voltage (V) at $t=i$;

$\Delta ti$ is the time interval between measurements (hrs); and $DVi$ is the diluate volume (m³) at $t=i$.

As Comparative Examples, the above experiments were repeated but with identical membranes in stack ED1 and stack ED2, as indicated in Table 4 below. In Comparative Example 1, both stacks used membranes AEM-A and CEM-A. In Comparative Example 2, both stacks used membranes AEM-B and CEM-B. In Example 1, stack ED1 used membranes AEM-A and CEM-A and stack ED2 used membranes AEM-B and CEM-B (i.e. the properties of the membranes in stack ED1 were different to the properties of the membranes in stack ED2).

TABLE 4

| Experiment | Comparative Example 1 (ED1 and ED 2 identical) | Comparative Example 2 (ED1 and ED 2 identical) | Example 1 (ED1 had lower ER than ED 2) |
|---|---|---|---|
| Current density applied to stack ED1 | 150 A/m² | 150 A/m² | 150 A/m² |
| Final conductivity of diluate exiting stack ED1 (mS/cm) | 10 | 10 | 10 |
| Voltage applied to stack ED2 (V) | 0.4 V/cell | 0.4 V/cell | 0.4 V/cell |
| Final conductivity of diluate exiting stack ED2 (mS/cm) | 0.75 | 0.64 | 0.64 |
| Membranes used in stack ED1 | AEM-A and CEM-A | AEM-B and CEM-B | AEM-A and CEM-A |
| Membranes used in stack ED2 | AEM-A and CEM-A | AEM-B and CEM-B | AEM-B and CEM-B |
| Energy consumption of stack ED1 (kWh/m³) | 5.6 | 8.3 | 5.6 |
| Energy consumption of stack ED2 (kWh/m³) | 2.3 | 1.4 | 1.4 |
| Total energy consumption of stacks ED1 + ED2 (kWh/m³) | 7.9 | 9.7 | 7.0 |

Table 4 shows that less total energy was consumed when the membranes used in stack ED1 had a lower electrical resistance than the corresponding membranes used in stack ED2 (7 kWh/m³), compared to when stacks ED1 and ED2 had an identical electrical resistance (7.9 or 9.7 kWh/m³).

The settings described in Table 4 above are only for demonstration. Even better performance may be obtained by using a higher number of cell pairs per stack and by optimizing the process settings (e.g. flow rate, current).

The invention claimed is:

1. An electrodialysis unit comprising at least two electrodialysis stacks (ED1 and ED2) connected in series, wherein:

(a) stacks ED1 and ED2 comprise anion exchange membranes and cation exchange membranes;
(b) the anion exchange membranes in stack ED1 have a lower electrical resistance than the anion exchange membranes in stack ED2 and the cation exchange membranes in stack ED1 have a lower electrical resistance than the cation exchange membranes in stack ED2;
(c) the water-permeability of the cation exchange membranes in stack ED2 is 2 to 20 times lower than the water-permeability of the cation exchange membranes in stack ED1; and
(d) the water-permeability of the anion exchange membranes in stack ED2 is 2 to 20 times lower than the water-permeability of the anion exchange membranes in stack ED1.

2. The electrodialysis unit according to claim 1 wherein the electrical resistance of the anion exchange membranes in stack ED1 is lower than 4 ohm·cm$^2$.

3. The electrodialysis unit according to claim 1 wherein the electrical resistance of the cation exchange membranes in stack ED1 is lower than 5 ohm·cm$^2$.

4. The electrodialysis unit according to claim 1 wherein the electrical resistance of the cation exchange membranes in stack ED1 is 1.5 to 20 times lower than the electrical resistance of the cation exchange membranes in stack ED2 and the electrical resistance of the anion exchange membranes in stack ED1 is 1.5 to 25 times lower than the electrical resistance of the anion exchange membranes in stack ED2.

5. The electrodialysis unit according to claim 1 wherein the water-permeability of the anion exchange membranes in stack ED2 is less than $30 \times 10^{-12}$ m$^3$/m$^2$·s·kPa and the water-permeability of the cation exchange membranes in stack ED2 is less than $30 \times 10^{-12}$ m$^3$/m$^2$·s·kPa.

6. The electrodialysis unit according to claim 1 which further comprises a third electrodialysis stack ED3 comprising anion exchange membranes and cation exchange membranes and being located downstream of stack ED2 and wherein stack ED3 is connected in series to stack ED2.

7. The electrodialysis unit according to claim 6 wherein the anion exchange membranes in stack ED2 have a lower electrical resistance than the anion exchange membranes in stack ED3 and the cation exchange membranes in stack ED2 have a lower electrical resistance than the cation exchange membranes in stack ED3.

8. The electrodialysis unit according to claim 6 wherein the anion exchange membranes in stack ED3 have a lower water-permeability than the anion exchange membranes in stack ED2 and the cation exchange membranes in stack ED3 have a lower water-permeability than the cation exchange membranes in stack ED2.

9. The electrodialysis unit according to claim 1 wherein the electrodialysis stacks are free from particulate ion exchange resins.

10. An apparatus for purifying water comprising an electrodialysis unit according to claim 1 and an electrodeionization unit located downstream of the electrodialysis unit.

11. A process for purifying an aqueous feed liquid comprising passing the feed liquid through an electrodialysis unit according to claim 1 such that the feed liquid is separated into a concentrate and a diluate.

12. The process according to claim 11 wherein the feed liquid passes through stack ED1 to form a diluate and a concentrate and then the diluate exiting stack ED1 is fed into stack ED2 in order to further lower the concentration of ions dissolved therein.

13. The process according to claim 11 wherein the average current density applied to stack ED1 is higher than the average current density applied to stack ED2.

14. The process according to claim 11 wherein the aqueous feed liquid is or comprises sea water or brackish water.

15. The process according to claim 11 wherein the diluate is potable water.

16. A electrodialysis unit according to claim 1 wherein:
(a) the electrical resistance of the anion exchange membranes in stack ED1 is lower than 4 ohm·cm$^2$;
(b) the electrical resistance of the cation exchange membranes in stack ED1 is lower than 5 ohm·cm$^2$;
(c) the electrical resistance of the cation exchange membranes in stack ED1 is 1.5 to 20 times lower than the electrical resistance of the cation exchange membranes in stack ED2; and
(d) the electrical resistance of the anion exchange membranes in stack ED1 is 1.5 to 25 times lower than the electrical resistance of the anion exchange membranes in stack ED2.

17. The electrodialysis unit according to claim 16 wherein the water-permeability of the anion exchange membranes in stack ED2 is less than $30 \times 10^{-12}$ m$^3$/m$^2$·s·kPa and the water-permeability of the cation exchange membranes in stack ED2 is less than $30 \times 10^{-12}$ m$^3$/m$^2$·s·kPa.

18. An apparatus for purifying water comprising an electrodialysis unit according to claim 17 and an electrodeionization unit located downstream of the electrodialysis unit.

19. An apparatus for purifying water comprising an electrodialysis unit according to claim 16 and an electrodeionization unit located downstream of the electrodialysis unit.

20. The electrodialysis unit according to claim 1 wherein stack ED2 is located downstream of stack ED1.

* * * * *